Dec. 28, 1937.   J. P. SPANG   2,103,563
MACHINE FOR SLITTING AND BROILING MEAT
Filed April 27, 1937   2 Sheets-Sheet 1

Inventor.
Joseph P. Spang
by Heard Smith & Tennant
Attys.

Dec. 28, 1937.  J. P. SPANG  2,103,563

MACHINE FOR SLITTING AND BROILING MEAT

Filed April 27, 1937    2 Sheets—Sheet 2

Inventor:
Joseph P. Spang
by Heard Smith & Tennant.
Attys.

Patented Dec. 28, 1937

2,103,563

UNITED STATES PATENT OFFICE 2,103,563

MACHINE FOR SLITTING AND BROILING MEAT

Joseph P. Spang, Quincy, Mass.

Application April 27, 1937, Serial No. 139,169

3 Claims. (Cl. 53—5)

This invention relates to a machine for slitting or tendering meat and has for its object to provide a novel machine for this purpose which is constructed so that it will not only slit or tender the meat but will also cook or broil the same so that when a slice of meat is subjected to the operations of the machine it is both tendered and broiled or cooked.

Meat-slitting or meat-tendering machines may be classified roughly into two classes, the machines of one class being provided with knives adapted to cut slits in a slice of meat extending thereacross, and the machines of the other class being adapted to cut a plurality of short disconnected slits in the meat.

My invention may be embodied in meat-tendering machines of either class and in order to give an understanding of the invention I have illustrated it as it might be applied to meat-tendering machines of both classes.

Figure 1:
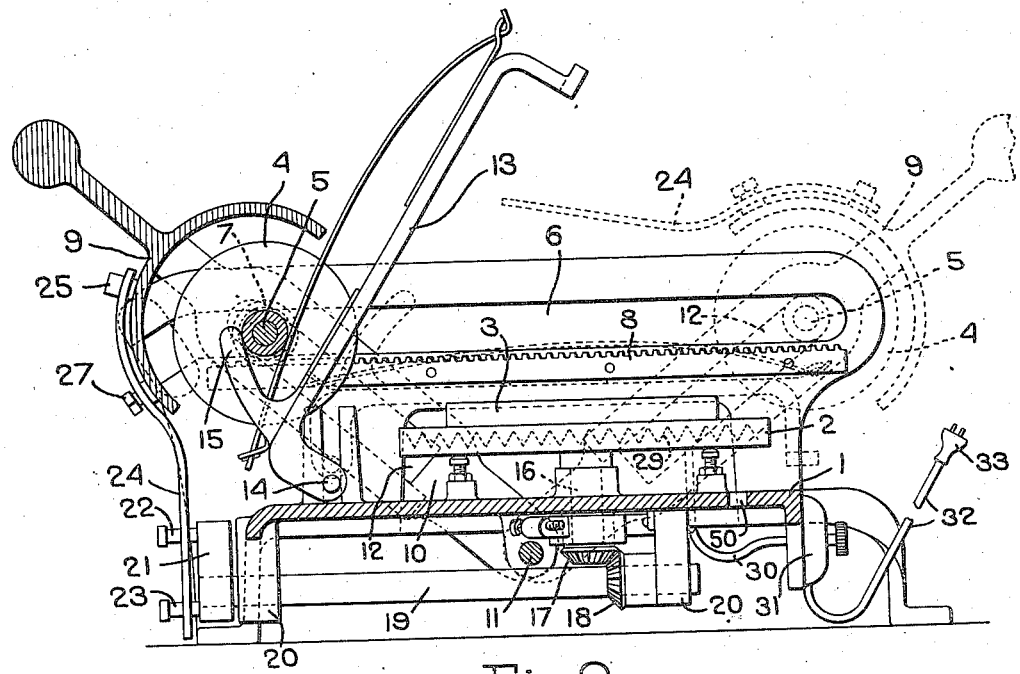
Fig. 1 is a cross-sectional view through a meat-slitting machine of the type having rotary knives to cut a plurality of parallel slits in a slice of meat and taken on the line 1—1, Fig. 3 but showing the knives in their retracted position.
Figure 2:
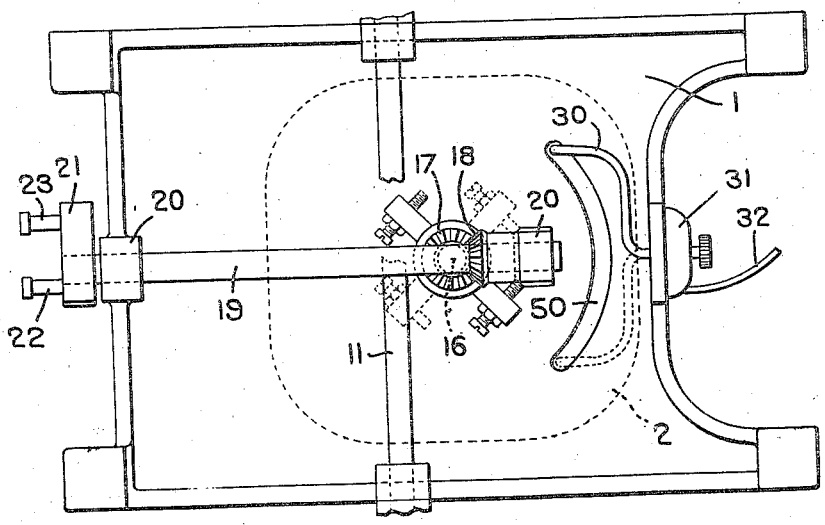
Fig. 2 is an under side view of Fig. 1.
Figure 3:
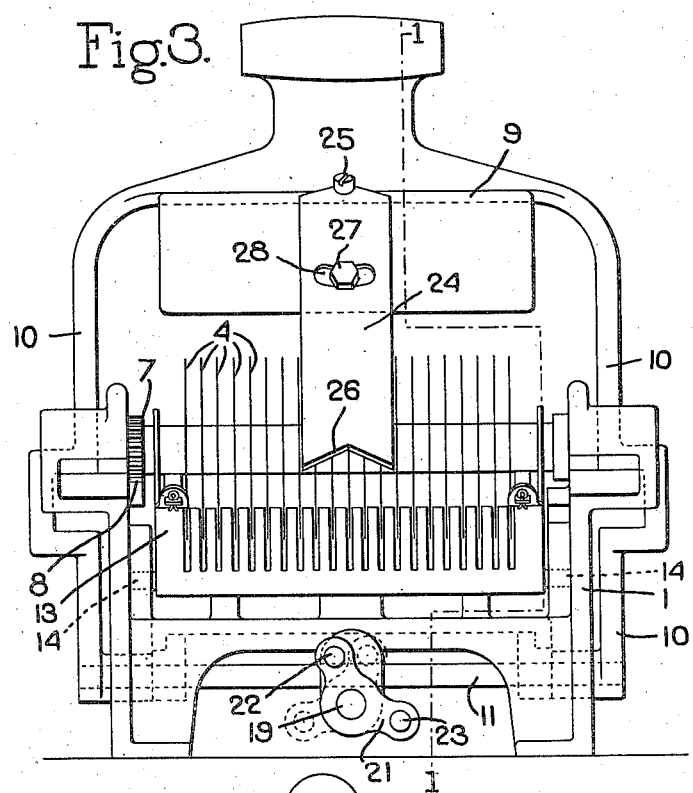
Fig. 3 is a rear view of Fig. 1.

The machine shown in Figs. 1, 2, and 3 is of the type illustrated in my Patent No. 1,942,985, January 9, 1934, and it comprises a suitable frame 1 carrying a meat-supporting plate 2 on which the slice 3 of meat to be slit and broiled is supported. The slitting of the meat is accomplished by a plurality of rotary knives 4 that are mounted on a knife-supporting shaft 5. This knife assembly is movable across the meat-supporting plate 2 and during its movement the knives are rotated to cut the slits in the meat. The ends of the knife shaft extend into and are guided by slots 6 with which the frame 1 is provided, and said knife shaft has on one end a pinion 7 which meshes with a stationary rack 8 secured to the frame so that the movement of the knife assembly longitudinally of the slots 6 causes the knives to rotate. The knife assembly is given its operative movement through a swinging actuating member 9 having the two arms 10 that are pivoted to the frame at 11. Each arm is provided with a slot 12 through which the knife shaft projects. With this construction the swinging movement of the actuator 9 from the full to the dotted line position Fig. 1 will move the knife assembly across the meat-supporting plate 2, and during this movement the knives will be rotated by the rack 8 and pinion 7 thereby to cut the slits in the meat.

13 indicates a hold-down member which rests on the slice of meat during the slitting operation, this hold-down member being pivotally connected at one end to the frame as shown at 14. The hold-down member has an arm 15 rising from one end thereof and which is engaged by the shaft of the knife assembly when the actuator 9 is moved into its retracted position shown in full lines Fig. 1, with the result that the hold-down is raised off from the meat when the knife assembly is in its retracted position. When the parts are in this position a fresh slice of meat may be placed on the table or plate 2 or the slit slice removed therefrom.

The meat-supporting plate 2 is in the nature of a turntable, and means similar to those illustrated in said Patent No. 1,942,985 are provided for giving the turntable a turning movement each time that the actuator 9 is moved into its retracted position shown in full lines. The turntable is provided with a shaft 16 which extends through the base portion of the frame and is provided at its lower end with a beveled gear 17 that meshes with a beveled gear 18 on a rock shaft 19, the latter being journalled in suitable bearings 20 formed on the frame. The rock shaft has fast to its end a yoke member 21 provided with two pins 22, 23, and the actuator 9 has secured thereto a bunter member 24 which co-operates with the pins 22, 23 to give the turntable its turning movement. This bunter member 24 is pivoted to the actuator 9 as shown at 25 and it is provided at its lower end with the notch 26. 27 indicates a retaining screw which is secured to the actuator 9 and extends through a slot 28 in the bunter.

Fig. 3 shows the actuator 9 in a mid-position and as said actuator 9 is moved from this mid-position into the full line position Fig. 1, the notched end 26 of the bunter will engage the pin 22 and turn the yoke 21 and shaft 19 from the full to the dotted line position Fig. 3, thereby giving the turntable a quarter rotation. Upon the next backward movement of the actuator 9 the bunter will engage the pin 22 which is then in raised position and will again give the turntable a quarter rotation.

The device as thus far described is the same as that described in my above-mentioned Patent No. 1,942,985.

In accordance with my present invention I provide means for heating the meat-supporting plate 2 so that the slice of meat will be cooked or broiled while it is supported on the plate, and thus the broiling or cooking of the slice of steak 2 can be accomplished simultaneously with the slitting thereof.

While any means for heating the plate 2 may be provided I prefer to heat it electrically, and for this purpose said plate will have embedded in it an electric heating unit 29 of some suitable construction. This heating unit is supplied with current through a cable 30 which leads to a switch device 31 with which the frame 2 is equipped. 32 indicates a supply cable carrying circuit wires and having an attachment plug 33 at its end for plugging into a wall socket or other electrical supply socket.

In using the device the cable 32 will be connected to the source of electrical supply and the plate 2 will be allowed to become sufficiently heated to broil the steak. A slice 3 of steak may be then placed on the heated plate when the parts are in the position shown in Fig. 1, and the operator will then swing the actuator 9 forwardly to the dotted line position, and then return it to the full line position thereby cutting a series of slits in the meat. When the actuator is returned to the full line position the table 2 will be given a quarter rotation and the operator will again move the actuator 9 from the full to the dotted line position and return it to the full line position thereby cutting a second series of slits in the meat. During this operation the meat is being cooked on one side. When the meat has been properly slit on one side and also cooked on the other side the operator may then turn the slice of meat over so as to cook the slit side thereof, and if desired the slice of meat may be subjected to another slitting operation while the previously slit side of the meat is being cooked or broiled. Whenever a fresh slice of meat is placed on the heated plate 2, the cooking or broiling operation causes the slice to adhere to the plate so that when the rotary knives are passed across the slice for slitting the latter said slice will be held to the plate and will not have any slipping movement thereon.

The bed of the frame is provided with a slot 50 in which the cable 30 moves when the turntable is turned.

Figure 4:
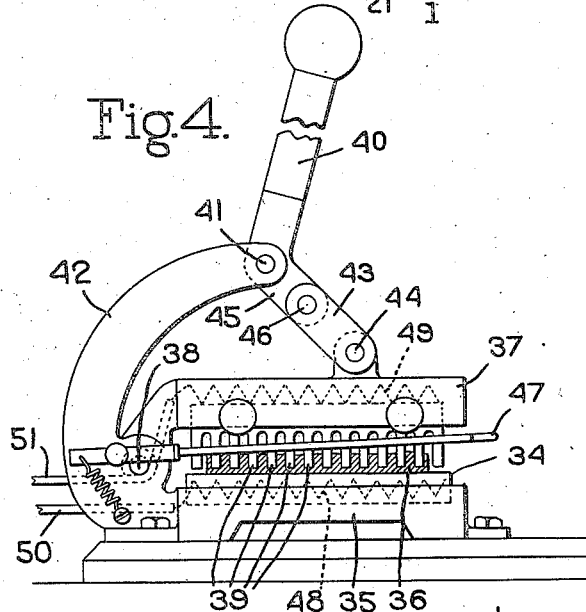
Fig. 4 is a view illustrating the invention embodied in a meat-tendering machine of the type constructed to cut a plurality of short disconnected slits in the meat.

In Fig. 4 I have illustrated the invention as applied to the type of meat-tendering device illustrated in Patent No. 1,959,828, May 22, 1934. This meat-tendering device comprises a meat-supporting plate 34 supported by the base 35 of the machine and on which the slice 36 of meat is supported, and it also comprises a knife-carrying member 37 pivoted to the frame at 38 and carrying a plurality of knives 39 adapted to cut short disconnected slits in the meat. The knife-carrying member 37 can be moved toward and from the meat-supporting plate 34 by means of an actuating lever 40 pivoted at 41 to an arm 42 with which the frame is provided. This actuating lever is connected to the knife-supporting member 37 through the medium of a link 43, the latter being pivoted at one end to the knife-carrying member as shown at 44 and at the other end to the arm 45 of the actuating lever 40 as shown at 46. The link 43 and arm 45 constitute a toggle device which is actuated by the lever 40. When the lever is swung backwardly to the dotted line position the knife-supporting member 47 will be raised to clear the knives 39 from the meat 36, and when the knives are thus raised the slice 36 of meat which has been slit can be removed from the supporting plate and a fresh slice replaced thereon.

47 indicates a stripper for stripping the meat from the knives when they are raised.

The device as thus far described is similar to that shown in said Patent No. 1,959,828.

In embodying my invention in a meat-tendering device of this type I propose to equip the meat-supporting plate 34, and if desired the knife-supporting member 37, with electrical heating units as indicated diagrammatically at 48 and 49. The heating unit 48 is supplied with current through the medium of wires contained in a suitable cable 50 and the heating unit 49 may be supplied with current through wires in a supply cable 51.

With this construction the under face of the slice 36 will be subjected to a cooking operation as soon as it is placed on the heated plate 34 and the cooking will continue while the actuator 40 is being operated to tender the meat. The heating element 49 will serve to heat the knives 39 sufficiently so that they will also subject the meat to a cooking operation, and with this embodiment of the invention both sides of the meat will be cooked simultaneously.

The heating of the knives has the advantage that the hot knives not only cut the slits in the meat but also sear the faces of the slits and thus prevent the meat juices from seeping out through the slits. With this construction the heated knives may cook the upper surface of the meat sufficiently so that it will not be necessary to turn the slice in order to complete the cooking operation.

While I have illustrated the invention as embodied in two types of meat-tendering devices, yet I wish to state that the invention is not limited in its application to the particular meat-tendering or meat-slitting devices shown but is capable of being embodied in any meat-slitting or meat-tendering device, and, therefore, I do not regard the invention as limited to the forms of meat-tendering devices herein illustrated.

I claim:

1. A machine for simultaneously tendering and cooking meat in slice form comprising a meat-supporting bed or plate for supporting a slice of meat, meat-slitting knives, means for producing a relative movement between the knives and the bed by which slits are cut in said slice of meat which extend entirely across the meat from one edge thereof to the opposite edge of said plate, and means to heat the plate sufficiently to subject the meat thereon to a cooking operation.

2. A machine of the class described comprising a meat-supporting plate in the form of a turntable, means for cutting slits in a slice of meat supported by said turntable, which slits extend from one edge of the slice of meat entirely across the slice to the opposite edge, means for heating the turntable sufficiently to subject the meat thereon to a cooking operation, and means for rotating the turntable.

3. A machine for simultaneously tendering and cooking meat comprising a meat-supporting plate for supporting a slice of meat, meat-slitting knives, means for producing a relative movement between the knives and the bed by which a plurality of slits are cut in the top face of the slice, which slits extend from one edge thereof entirely across the slice to the opposite edge, and means for heating the plate sufficiently to subject the under face of the meat to a cooking operation.

JOSEPH P. SPANG.